R. L. LLOYD.
PROCESS FOR TREATING METALLIFEROUS ORES.
APPLICATION FILED DEC. 30, 1912. RENEWED NOV. 1, 1915.

1,215,672.

Patented Feb. 13, 1917.

Witnesses

Inventor
Richard L. Lloyd
By
Attorney

UNITED STATES PATENT OFFICE.

RICHARD LEWIS LLOYD, OF NEW YORK, N. Y., ASSIGNOR TO DWIGHT & LLOYD METALLURGICAL COMPANY, OF NEW YORK, N. Y., A CORPORATION OF NEW JERSEY.

PROCESS FOR TREATING METALLIFEROUS ORES.

1,215,672.      Specification of Letters Patent.      Patented Feb. 13, 1917.

Application filed December 30, 1912, Serial No. 739,335. Renewed November 1, 1915. Serial No. 59,149.

*To all whom it may concern:*

Be it known that I, RICHARD L. LLOYD, a citizen of the United States, residing at New York, in the county of New York and State of New York, have invented certain new and useful Improvements in Processes for Treating Metalliferous Ores, of which the following is a specification, reference being had therein to the accompanying drawings.

This invention relates to improvements in the art of desulfurizing oxidizing and smelting ore masses which are composed of the sulfids or analogous compounds of the metals in fine condition; particularly when two or more metal sulfids are mingled.

The object is to effect, approximately simultaneously, the several chemical changes, modifications or reactions which are necessary in order to finally obtain the desired metals or metal compounds from initial sulfids, or to effect these reactions in such intensely rapid succession that it will be substantially the same as if they were simultaneous.

It is well known, and does not require prolonged description, that in metallurgical work of this sort (as now practically carried on in the art) the several successive steps are entirely separated, being not only appreciably remote from each other in time, but being carried on one in one place and another in another.

For example, the oxidizing and desulfurizing are accomplished on an elongated roasting hearth whereon a bed or stratum of the metal sulfid fines is exposed, and where it is subjected to the action of reverberatory heat, accompanied by rabbling, or the like, to effect the oxidizing reaction, this oxidizing being carried down to the point where there is left in the mass the desired percentage of the sulfur component. Then the ore, (after being withdrawn from the roasting hearth and stored at some relatively remote point) is introduced into the smelting furnace and is there subjected to the treatment required to obtain the regulus from the mixed oxids and sulfids of the mass in hand.

It is unnecessary for those acquainted with the long, tedious, and expensive steps above mentioned to describe the desirability of substituting for them a more rapid and economical process and establishing a method by which the initially raw native sulfids can be instantly transferred into the regulus now obtained at the end of this old series of steps, that is to say, at the termination of the treatment in the smelting furnace.

Not only has there been recognition of the disadvantages incident to these earlier processes for treating sulfids but there have been numerous proposals to obviate them made by metallurgists. For example, it has been proposed to accomplish these several chemical reaction steps in quick succession by introducing at one point only finely divided sulfid ores into a confined relatively short, reverberatory furnace chamber these steps being proposed under the action of an air blast, and, oxidizing the sulfur and metallic components while in transit with the air, and then carrying the gaseous products and the fine metallic and other solid particles onward through the chamber with the expectation that the gases and vapors would finally rise to the stack while the non-gaseous particles would finally drop under the action of gravity and settle upon the floor and there react upon each other in a manner analogous to that followed by the masses in an ordinary smelter bath chamber.

But experience disclosed that what was expected to occur when following such suggestions could not be brought about, the currents of inward-projected air and the currents of gas drawn toward the stack by the powerful suction draft resulting from the intense heat imparted to the gaseous products, not only swept the gas volumes themselves rapidly onward through the prolonged furnace chamber and then upward to the flues and the stack, but also caused a similar travel upward and onward of the minute particles of the metallic and other solid bodies. And the latter were separated as sub-masses differing from each other, and collected in different parts of the passageways according to their varying specific gravities and grades of fineness. It was supposed that the reactions which would occur among the solid particles while they were in the upper part of the oxidizing and desulfurizing furnace would be of such nature that the necessary subsequent conditions for smelting could be reached; that is to say, it was expected that reactions would occur, immediately after the instant of oxidizing and desulfurizing, similar to those that take place in the smelter bath.

But in this respect, also, experience demonstrated that there was serious error. It was found that the individual minute particles of the metallic and other solid bodies, after being driven into the furnace chamber by the air blast, and even after the oxidizing and disassociation of the sulfur components, still remained segregated, and that under the propelling influence of the blast and of the draft suction they were carried on, as above remarked, to the flues and to the stack without any occurrence of the reactions necessary to effect smelting.

And it was further found that the requisite reactions could not be carried on, or could not be assured to occur, with the necessary accuracy as to desulfurizing and oxidation where only a single point of ore supply was provided for the chamber.

Guided by my observations of the phenomena characterizing the experiments under these earlier proposals I have succeeded in developing a method for treating sulfid bodies, of the nature specified, by which I obviate these difficulties and disadvantages. It includes the supplying of ore and solid materials to the furnace at two or more points, so that the actions of the ore and other materials supplied at one point (and also the products of those actions) can be modified by material supplied at another point. It includes moreover as another feature the arresting of the rapid travel (caused by the air blast and the gas suction) of the particles consisting of, or containing, the metals and the other solid bodies.

In order that the subject-matter, generally considered, now being described may be typified for the reader, he can have in mind an initial mass of sulfid fines which is composed principally of copper sulfid and iron sulfid together with more or less of the other bodies, commonly found associated with these in the grades of ore which are characterized by their presence; and can regard these as being forced by an air blast into a furnace chamber and there instantly oxidized at a high heat.

What I have discovered is that immediately after the instant at which the fine metal-bearing particles are subjected to the high heat (including the heat which is supplied from surrounding regions in the furnace and also the heat developed by the oxidizing of the metal and of the sulfur) there is such a sudden drop in the temperature, through heat radiation, of the scattered particles that those actions and stages of condition which characterize the smelting bath cannot be attained. And that in this fact resides the cause of the difficulty which has been experienced heretofore in the efforts and with the proposed plans for effecting the instantaneous combined roasting and smelting of such materials. Before this drop in temperature the particles must be brought into immediate physical contact, one with another, and must be caused to mass together in order that the chemical reactions ordinarily occurring in the smelting furnace bath can be secured.

I effect this arresting of the particles at the critical instant of their highest heat by means of baffling devices (of suitable character) so placed that they are impinged upon by the flying particles, and are stopped by them when in the proper condition, the gaseous components of the general mass in the chamber being separated therefrom and permitted to pass rapidly on to the exterior through the flues and the stack. These baffling or arresting devices are of the nature of obstructions in the paths of the air and of the gas currents. It is preferable to have them arranged successively in a series in the said paths, for the minute metallic bodies of the stream are not all brought to the proper conditions (as to nascency, temperature, etc.) at the same transverse plane; and by having a series of successively acting baffling devices those particles which reach the conditions specified at a relative early instant will be arrested by one of them, while others, which do not reach these conditions until later instants, will impinge, and be caught upon, the surface of one baffle or another later in the series.

The metallic particles are, at the instants of impact, in such condition that they are susceptible of entering into intimate relation, physically and chemically with each other, and at those instants the reactions among them set in which are characteristic of a smelting operation. The accumulation on the baffles is such that relatively large masses rapidly form, and then drop to, and are collected in, the bath chamber below. In this chamber they can be retained as long as may be desired, and reactions of any of the ordinary sorts can be secured, according to the conditions created by the metallurgist.

The arresting walls or baffle obstructions can be regarded as preliminary bath regions, that is to say, they are places where actions and reactions take place corresponding to the first that occur in the ordinary smelting furnace and its bath.

Figure 1:
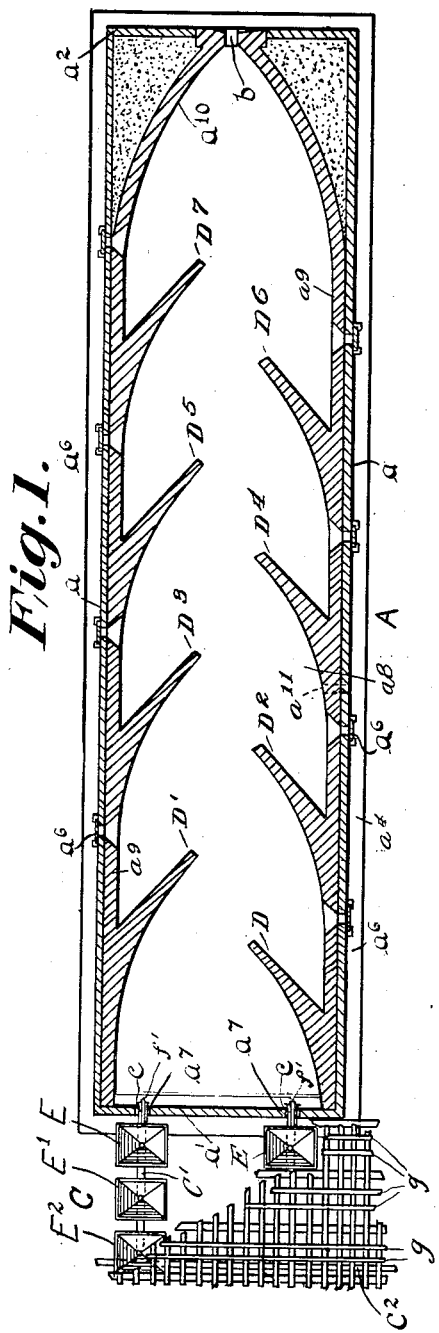
Figure 1 is a horizontal section of a furnace apparatus of one of the forms adapted to carry out my improvements in the art.
Figure 2:
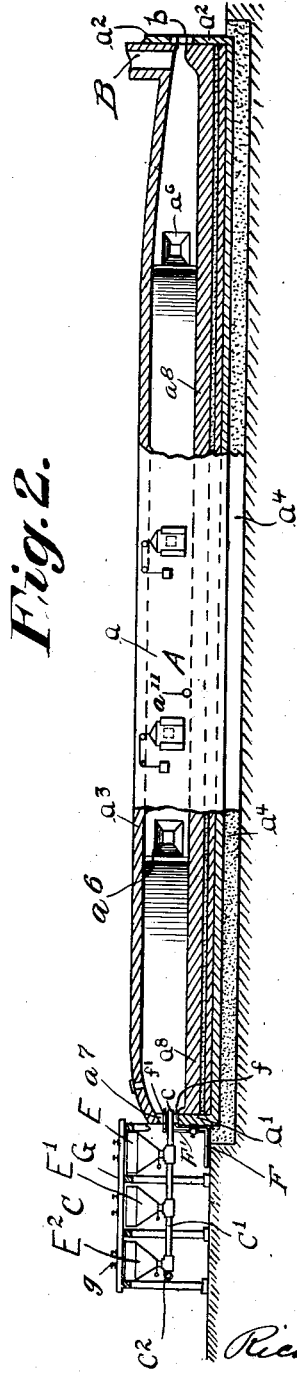
Fig. 2 is a view, partly in side elevation, and partly in longitudinal section.
Figure 3:
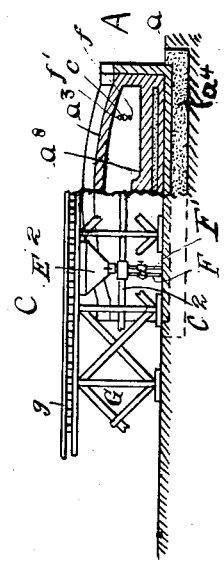
Fig. 3 is a view partly in end elevation and partly in transverse section.

Referring to the apparatus or plant shown in Figs. 1 to 3, A indicates the furnace part as an entirety. It is indicated as formed with exterior shell walls $a$ at the sides, $a^1$ at the receiving end, and $a^2$ at the delivery end, with a top or cover $a^3$, and a masonry foundation at $a^4$. Inside of the shell part there is arranged the refractory lining wall where necessary, as shown at $a^9$, $a^{10}$. Upon the foundation there is erected the bath element, or hearth, indicated at $a^8$ and extending from one end wall to the other, the bath chamber being, as indicated, a depression below the level of the inlet orifices $a^7$ and the discharge orifice $b$. In the sides there are apertures and windows, as shown at $a^6$, suitably arranged at any points preferred, for meeting any of the purposes of the apertures ordinarily formed in the side walls of reverberatory or roasting furnaces.

At the discharge end is the escape passage for the gaseous products of combustion, indicated generally by B, this being connected if desired with the fire boxes or heating chambers of the boilers of the plant; in respect to which they can be disposed in any of the now well known ways; the fire boxes generally in turn communicating with the final stack.

In the region indicated by C is arranged the apparatus by which the ore and other solid materials are delivered to the interior of the furnace chamber. The parts included in this supply mechanism can be of any of various forms, as concerns their details. I have shown one which comprises a framework indicated by G having uprights, sills, and cross bars. Upon this frame there is shown a track system at $g$, by which materials are carried to or from the various hoppers or bins. Of the latter there are two or more series those of each series being indicated by E, $E^1$, $E^2$, and adapted either to all hold material of the same sort, or to respectively hold materials of different sorts, such as are combined in various ways for the accomplishing of different purposes in metallurgical work. The hoppers or bins are respectively provided with valves, dampers, or like devices, for controlling the proportions of the solid materials delivered, which pass therefrom to the interior of the furnace.

Within this region at C, is disposed also the air delivery apparatus, which is shown as comprising one or more delivery pipes $C^1$, communicating directly with the interior of the furnace chamber, they having suitably formed nozzles at $c$, which are inserted through the end apertures $a^7$. Of these there can be as many as necessary. I show two, one arranged on longitudinal lines relatively close to the right hand vertical side wall of the furnace, and the other arranged similarly in relation to the left hand wall.

These air delivery pipes communicate with the supply system indicated at $C^2$, which is connected to the compressing apparatus or blowers, suitably located in the plant.

At F, $F^1$, there are indicated parts of a fuel supply system. As shown, they are pipes intended for delivering gas or liquid fuel and terminating in delivery nozzles at $f$, $f^1$, adjacent to the nozzles of the pipes which deliver the air and streams of solid material.

The interior of the furnace chamber is constructed or provided with baffles or obstructing devices arranged in the paths of the currents of air, and of the gases produced by the reactions in the particles of solid material that are carried in by the air. As shown in the mechanism now being described, these are partial walls or partial vertical diaphragms, indicated by D, $D^1$, $D^2$, etc. They are initially built in as part of the refractory element of the furnace, being integral with or extending continuously from the side wall parts, $a^9$. Preferably, they are staggered, as concerns their positions in transverse planes, each of those on the right side preceding (in transverse planes), one upon the left. In other words, those at D, $D^2$, $D^4$, etc., are in transverse planes intermediate of the transverse planes of those at $D^1$, $D^3$, $D^5$, etc. Those upon the right hand side, it will be seen, are in planes which intersect the longitudinal lines of the initial projection of the jets or streams of material which are carried in by the right hand jet apparatus; and the same is true as concerns those on the left.

If the solid material that is to be treated in the furnace is of such nature and constitution that it can be delivered directly to the furnace, without the addition of modifying bodies, the bins or hoppers at E, $E^1$, $E^2$, can be kept loaded therewith, subject to withdrawal for the furnace.

If, however, the materials are such as to demand modification, one by another, (as by the intermingling of one with another, prior to the introduction to the furnace), the hoppers or bins, respectively, will be loaded by the materials of the different classes that are to be so mingled. And, as indicated, the proportions of one relative to another, can be readily changed from time to time, there being means combined with the bins for increasing or decreasing the relative quantity from each that is carried away by the delivery apparatus in a given period. And this apparatus can be used to advantage with the commonly found ore mass above referred to as a type, namely, one containing iron sulfid and copper sulfid, together with more or less of the usually accompanying bodies such as silica, alumina, and others. This principal mass is to be temporarily stored in the bins or hoppers at E. The bin at $E^1$ can be used for storing silica which it is frequently found necessary to add to the mass above referred to. Lime can be held in the bin at E², this being another material which is frequently demanded for mixing with those above specified.

Such materials have been heretofore commonly treated, as already mentioned, by passing them through a roasting apparatus for the oxidizing and combustion of a major part of the sulfur, and by then delivering them to the smelting furnace and treating them in such way as to form matte, together with a proportionate quantity of slag. The matte, as is well known, is a compound metallic body comprising iron sulfid and copper sulfid (with or without others), and after being taken from the smelting furnace it is further treated in well known ways for the separation of the metals. It is produced by a series of reactions in the smelter furnace chamber briefly summarized as transfers of oxygen and sulfur, which transfers are made possible at a high temperature, and require a delicately adjusted environment, chemically considered. And these transfers of the constituent elements and this delicate adjustment of the protecting environment are possible only when there is more or less of an appreciable mass of the highly heated metallic bodies. Such massing of the metalliferous bodies under the necessary protecting conditions is secured in the old smelting furnace to which the previously oxidized and desulfurized bodies are delivered.

One of the purposes of the present process is to supply these conditions where the metallic components, initially in a finely divided state, have their minute particles, while remote from each other, almost instantaneously oxidized and desulfurized; and where they would instantly thereafter lose the heat necessary for smelting and matte-forming and be carried to the exterior of the furnace, and to bring these minute and separated particles (practically simultaneously with the desulfurizing and oxidizing) into that mass relationship which is necessary to attain the matte forming which is reached in smelting.

With the present mechanism, after the interior of the furnace has been highly heated by fuel supplied from the fuel-delivery devices at $f$, $f^1$, the solid materials are allowed to pass, in proper proportions, from the bins E, E¹, E², into the air ducts C¹, and being in fine condition the particles are forced violently through the nozzles $c$. Their chemical constitution renders them inflammable when heated in the presence of oxygen. The resulting combustion, that is, the oxidizing of the sulfur component and also of the metallic bodies, itself produces a high heat which according to the present contemplation is, under many circumstances, sufficient to carry on the treatment indefinitely, after the fuel supply from the ducts at F, F¹, is shut off.

The particles of the finely reduced materials are directed into the furnace on lines approximately longitudinal thereof. As soon as their combustion occurs volumes of hot gaseous products are formed and these, together with the incoming jets of air, tend to sweep the fine particles of solid oxids onward through the furnace and to the escape passages. These several agencies not only tend to keep the solid particles separated from each other but also are sufficient to carry the whole of the mass through the entire furnace, through the flues, and finally to the stack. And this has been the result heretofore in following any of the methods known to me that have been suggested.

But in my case very different results are obtained, because of the structure of the interior of the furnace. For the rapidly expanding and onward moving gaseous bodies there is ample passageway for escape; but it is more or less tortuous and defined by walls which furnish sharp interrupting surfaces against which the highly heated and oxidized solid particles impinge at the nascent instant.

As shown in Fig. 1, the interrupting or baffle devices at D, D¹, etc., are so arranged, in relation to the initial nozzles, that the solid metallic particles strike against one or another almost instantly after entry. But although this impinging occurs with great rapidity, it must be conceived of as later than the time of the instant of commencement of the first chemical reaction; that is to say, the oxidizing of the sulfur and metal components commences instantly on the escape of the particles through the nozzle orifices.

If the particles are sufficiently small, this commencement of the reaction must be understood as not only commencing, but also as terminating, immediately; the period of nascency being correspondingly short. While that period is continuing (short as it is) the particle reaches and strikes the baffling wall D. If the particle be somewhat larger, the period of primary chemical reaction and of nascency is to be regarded as continuing somewhat longer, and in such case, the particle may reach the second, third or other later baffle without responding to the tendency to mass or agglomerate with other particles. But, as I have found, sooner or later in a properly constructed apparatus of this class that stage in chemical reaction and in physical condition is reached where properly related particles striking against the baffles not only tend to adhere thereto but adhere to each other. In this way, small sub-masses of matte material are formed, provided that this massing or agglomerating upon the baffle occurs before the dropping of the temperature of the impinging particles below that degree where the smelting or matte-forming action occurs.

After a furnace of this character has been once put into full operation, the process becomes continuous. The solid particles projected into the chamber as a continuous stream are, with intense rapidity, oxidized, brought to a nascent condition, and driven against the baffles, the result being the constant formation of first, viscid, and then liquid, masses which drop from the baffles to the bath chamber below.

If the surplus oxidizing or over-oxidation referred to should occur, it can be corrected in either of several ways by an apparatus such as shown. Under some circumstances, one of the sets of ore-delivering devices (the parts at C, E, $E^1$, $E^2$) and their valve or damper mechanism can be so adjusted as to supply the major part of the ore and flux materials required for maintaining the cloud which is in suspension and undergoing combustion in the furnace chamber, and the ore-delivering devices of the other set can be so arranged as to supply more or less ore to properly modify the reaction, and increase or decrease the degree of oxidation.

Under other circumstances, especially where a reducing atmosphere is needed to modify the degree of oxidation of the sulfids, a suitable atmosphere can be obtained from the combustion of the gaseous or liquid fuel supplied through the ducts $f$, $f^1$, and their nozzles, they being provided with valves, as shown in Figs. 2 and 3, to vary the reducing atmosphere which they can form in the furnace chamber. The sulfid ore, which can be delivered from either of the sets of supply devices, can, by means of the valves combined with the hoppers, be increased in relation to the air volume in such way as to prevent the total volume of air which is injected into the furnace from over-oxidizing the metal bodies either while in suspension in the upper part of the chamber, or after being collected in the bath hearth.

As above described, the bins or hoppers are capable of widely various uses in respect to the materials which they hold and the proportions of such materials, respectively, which they deliver to the furnace at any one time. It has been mentioned that all of the hoppers E, $E^1$, $E^2$ of the series may be supplied with ore material, or that one of the series may be supplied with ore and another with flux materials, and also that a fuel element, such as reduced carbon, may be supplied in a stream from a separate holder or mixed with the ore in one or more of the bins.

By having two or more supply systems for solid material and two or more points of introduction for ore or other solid material to the furnace, I can readily secure a mass of components varying in any desired proportion in the furnace, and my process involves the supplying of re-agents and counter-agents according to the physical and chemical conditions met with at the time of working. While the solid material under preferred regulation of components is being delivered at one point of introduction, the valves or dampers at another point can be so set as to provide whatever modification is required, either in the initial materials delivered, or in the products that are being formed, as concerns desulfurizing, oxidation and heat production. If it is found that the ore material in the hopper of one of the series is low in sulfur or metal, or both, and therefore does not demand a high proportion of oxygen, an ore richer in metal and sulfur can be supplied to the ore hopper of the other series of bins, and the process so carried on that there shall be the desired balance reached in respect not only to heat production, but also in respect to desulfurizing and oxidation. Over-oxidation can be corrected and a low degree of under-oxidation can be brought up to the degree required. If at any time it is desired to relatively increase the extent of slag forming, or to vary the nature of the slag formed, it can be accomplished by properly manipulating the valves or dampers of the bins of one of the sets, as the mechanism shown is such that I can either vary the quantities of ore admitted at the two points of supply in relation to each other, or to vary the mixture at the time the metallic components are in a molten condition, and can also vary the other solid bodies that are introduced.

After one set of ore-supplying devices has had its parts regulated to properly meet the set of conditions or circumstances in the work in hand, it is not desirable to vary their adjustment or regulation unless imperatively necessary. But as ore and other solid materials are delivered to the furnace at two points, the work being effected in the furnace and the results attained can be modified as desired without varying the adjustments of the first set of parts.

When the furnace is provided with arresting devices, the combustion can be maintained approximately uniformly throughout its entire interior, so that highly heating and reaction commence practically immediately upon the entering of the ore particles, and even though there may be differences in the proportions of the materials delivered at the points of introduction, the arresting devices practically instantaneously cause such an intermingling that the cloud of spray mass becomes substantially uniform at an early instant.

The process being carried on under protection against surplus oxidizing, the usual reactions of the silica the iron oxid and other bodies are allowed to occur simultaneously with the forming of the metal combinations which constitute the matte. The former results in rapid accretions of slag masses also collecting on the baffle walls. As they trickle or drop into the bath chamber, the usual separation takes place between the slag and the heavy metal components, the slag finally rising to the overflow orifice at $a^7$ and the metal or matte being drawn off at the tap hole $a^{11}$ whenever necessary.

It will be readily seen that in many respects there can be departure from the specific subject matter above presented in detail without departing from the essential features of my invention. For example, I selected for illustration a single sulfid mass and described it as possibly modified by the introduction of supplemental quantities of lime or silica.

But it is common practice to mingle two or more separate sulfid masses, varying from each other in their chemical composition. The present apparatus and method can be used with such bodies, the desired mingling or mixing occurring before blowing them into the furnace. Such intermingling of one sulfid or other ore mass, with another may be effected in order to insure a sufficient quantum of fuel component in the total mass. One ore body may be relatively low in sulfur and will require proper mixing with one which is relatively higher in its percentage of that body.

And again in some metallurgical operations a native fuel component will be entirely absent, and in such cases I introduce a separate fuel such as pulverized carbon or carbonaceous material. This fuel element may be mixed with the ore before it is delivered to a separate receptacle such as that at E, or it may be delivered to a stream of the ore from a separate holder. In still other cases I provide for the employment of a liquid fuel, such as oil, or an inflammable gas, to be delivered in any suitable way in conjunction with the material to be treated.

Nor do I limit myself to the production of a regulus, or what is commonly called matte, for as is well known if the oxidation and desulfurization be carried to the proper point (this being readily done by suitable manipulation of the air) the reactions will result in the production of a slag, as before, and of a metallic body instead of a regulus or matte. In this case the relative quantity of air and oxygen is larger and the oxidation of the ore masses is more complete than when a regulus or matte is to be formed.

The process is applicable to the treatment either of native ore bodies, such as have been above referred to, or to those which are known as concentrates, masses artificially produced by washing out from the native masses the worthless or unnecessary constituents.

And even mattes themselves after being properly prepared can be further treated in the way above described, as they can be fed into the furnace the same as the natural sulfids and can be mingled with the necessary fluxing materials, such as silica, this resulting either in a more highly enriched matte and a slag, or in a slag and a free metal, such as copper; the operation in that case taking the place of that which is now carried on in converters.

I do not herein claim any of the novel features incident to the apparatus which I have shown, but reserve the right to file applications for patent for the new and useful improvements embodied therein.

What I claim is:—

1. The herein described process for treating metalliferous ores in fine condition, which consists in projecting a stream of the ore fines into a confined chamber, subjecting the scattered particles to a high heat thereby causing initial chemical reactions therein, then while in a highly heated and nascent state suddenly arresting said particles while being driven by the force of projection and before reaching the chamber exit and causing them to mass together to form relatively small accretional bodies wherein incipient smelting action occurs, and then collecting the said bodies in a smelting bath, substantially as set forth.

2. The herein described process for treating metalliferous ores in fine condition, which consists in air blasting a stream of the ore fines into a confined chamber, oxidizing them at a high heat by the oxygen of the blast, then while in a highly heated and nascent state suddenly arresting said particles while being driven by the force of projection and before reaching the chamber exit and causing them to mass together to form relatively small accretional bodies wherein incipient smelting action occurs, and then collecting the said bodies in a smelting bath.

3. The herein described process for treating the sulfids, and the like, of metals, in fine condition, which consists in projecting a stream of the fines into a confined chamber, subjecting the scattered particles to a high heat thereby oxidizing them and lowering the quantity of the sulfur, or the like, component of the said particles, suddenly arresting them while in a highly heated and nascent state and before they reach the chamber exit causing them to mass together to form relatively small accretional bodies, and collecting the said bodies in a bath.

4. The herein described process for treating the sulfids, and the like, of metals, in fine condition, which consists in air blasting the fines in a stream into a confined chamber, subjecting the separated particles to a high heat thereby oxidizing them and lowering the quantity of the sulfur, or like, component of the said particles, suddenly arresting said particles while in a highly heated and nascent state and causing them to mass with each other, forming relatively small molten bodies of the agglomerated particles and collecting the said bodies in a bath, and permitting the gaseous products to be withdrawn from the interior of the confined chamber, substantially as set forth.

5. The herein described process for treating sulfid ores, and the like, in fine condition, which consists in air blasting the fines in a stream into a confined chamber, subjecting the separated particles to a heat sufficiently high to effect smelting reactions, suddenly arresting them, and before they reach the chamber exit causing them to mass with each other when in a highly heated and nascent state to form relatively small molten bodies, collecting the relatively small molten bodies in a bath, and causing the gaseous products to be diverted from the paths of the metallic particles, substantially as set forth.

6. The herein described process for treating metalliferous ores in fine condition, which consists in projecting a stream of the ore fines into a confined chamber, subjecting the scattered particles to a high heat, thereby causing initial chemical reactions therein, then while in a highly heated and nascent state suddenly arresting said particles while being driven by the force of projection and before they reach the chamber exit causing them to mass together to form relatively small accretional bodies wherein incipient smelting action occurs, and then collecting the said bodies in a smelting bath immediately below the region of arresting, substantially as set forth.

7. The herein described process for treating metalliferous ores in fine condition, which consists in projecting a stream of the ore fines into a confined chamber, subjecting the scattered particles to a high heat, thereby causing initial chemical reactions therein, then as the particles advance and become highly heated and nascent and before they reach the chamber exit causing them to mass together some at one place and some at another to form relatively small accretional bodies wherein incipient smelting action occurs, and then collecting the said bodies in a smelting bath, substantially as set forth.

8. The herein described process for treating metalliferous ores in a fine condition, which consists in air blasting a stream of the ore fines into a confined chamber, oxidizing them at a high heat by the oxygen of the blast, then while the particles are in a highly heated and nascent state suddenly deflecting the air and gaseous products successively at a plurality of places thereby causing the particles to mass together at a plurality of places to form relatively small accretional bodies wherein incipient smelting occurs, and then collecting the said bodies in a smelting bath.

9. The herein described process for treating material in a finely divided condition and containing metalliferous and combustible substances, which consists in air blasting a stream of the material into a confined chamber, causing the said combustible substance to unite with the oxygen of the blast thereby subjecting all of the scattered particles to a high heat, then while in a highly heated and nascent state suddenly arresting said particles while being driven by the force of projection and before they reach the chamber exit causing them to mass together to form relatively small accretional bodies wherein incipient smelting action occurs, and then collecting the said bodies in a smelting bath, substantially as set forth.

10. In the treatment of ore, the process of subjecting a charge of the ore material in a finely divided state to the action of an oxidizing atmosphere in the presence of a combustible component in an inclosed chamber, maintaining the temperature of reaction at a point to effect fusion of the charge while in suspension in the said chamber, collecting into a bath the products of the oxidizing reaction, and delivering to the chamber ore or suitable solid re-agents supplemental to the aforesaid charge of ore material to regulate as required the character and extent of the reactions.

11. In the treatment of ore, the process of subjecting a charge of the ore material in a finely divided state to the action of an oxidizing atmosphere in the presence of a combustible component in an inclosed chamber, maintaining the temperature of the reaction at a point to effect fusion of the metalliferous products while in suspension, collecting the fused products in a bath, introducing to the chamber a mass of ore or solid material supplemental to the aforesaid charge, and introducing a combustible carbon and maintaining the heat of the furnace contents at the temperature of reaction until the bath is of the desired constitution.

12. In the manufacture of copper matte, the process of spraying in a treatment chamber a mass containing finely divided copper sulfid iron and fluxing material in the presence of a supporter of combustion, igniting the mass of the said spray in said chamber while in suspension, continuing the introduction of fresh particles of ore and flux after ignition, regulating the supply of ore fuel components and air to maintain oxidization of the sulfur and iron and the slagging of the iron thus oxidized, at a rate to raise the temperature to the point of fusion of the matte-forming copper sulfid and slag while the particles are in suspension, collecting the fused material and slag in a bath at the bottom of the chamber, and supplying to the chamber ore or a suitable solid material to vary the degree of oxidation of the products of reaction while the mass is still at the reaction temperature.

13. The herein described process for treating metalliferous ore in fine condition, which consists in projecting a stream of ore fines into a confined chamber, subjecting the particles to a high heat and the action of an oxidizing atmosphere, thereby causing oxidizing reactions therein while in a highly heated nascent state and while in a state of suspension, collecting in fluid form the metal products of the said reactions, and simultaneously introducing another mass of ore susceptible of being oxidized within the said chamber.

14. The herein described process for treating metalliferous ores when in fine condition, it consisting in air blasting a stream of the ore fines into a confined chamber oxidizing them at a high heat by the oxygen of the blast, simultaneously introducing other bodies of the ore supplemental to those of the said stream, and causing the said two bodies of ore to form a properly oxidized fluid mass at a smelting temperature.

15. The herein described process of roasting and smelting sulfid of iron or copper ore to produce a matte mass, it consisting in projecting the ore while in fine condition into an inclosed chamber forming a cloud or spray, simultaneously supplying oxygen, subjecting the ore to a high heat, causing the oxidation of the sulfur to the point required for copper matte, collecting as a bath the products of the reaction in fluid condition, and supplying to the furnace chamber a mass of copper ore supplemental to that introduced by the said blast.

16. The herein described process for treating metalliferous ores in fine condition, which consists in air blasting a stream of the ore fines into a confined chamber, oxidizing them at a high heat by the oxygen of the blast, then while in a highly heated and nascent state, suddenly arresting said particles while being driven by the force of chamber projection, and before reaching the chamber exit, causing them to mass together to form relatively small accretional bodies wherein incipient smelting action occurs, collecting the said bodies in a smelting bath, and introducing a supply of ore supplemental to that in the aforesaid stream.

In testimony whereof I affix my signature, in presence of two witnesses.

RICHARD LEWIS LLOYD.

Witnesses:
 JOHN KNOX,
 WILLIAM J. HOLLEN.